Oct. 18, 1966  S. T. MICHAELSON  3,279,607
OIL FILTER CARTRIDGE
Filed Dec. 17, 1962  2 Sheets-Sheet 1

INVENTOR
STANLEY T. MICHAELSON
BY *Arthur Jacob*
ATTORNEY

Oct. 18, 1966   S. T. MICHAELSON   3,279,607
OIL FILTER CARTRIDGE

Filed Dec. 17, 1962   2 Sheets-Sheet 2

INVENTOR
STANLEY T. MICHAELSON
BY Arthur Jacob
ATTORNEY

United States Patent Office 3,279,607
Patented Oct. 18, 1966

3,279,607
OIL FILTER CARTRIDGE
Stanley T. Michaelson, 4 Brookfall Road,
Highland Park, N.J.
Filed Dec. 17, 1962, Ser. No. 245,180
4 Claims. (Cl. 210—223)

The present invention relates to oil filter cartridges and, more specifically, to disposable oil filter cartridge assemblies for use in internal combustion engines wherein such a cartridge operates to eliminate harmful ingredients from lubricating oils which are circulated through the engine and the cartridge.

Lubricating oils which are circulated through an internal combustion engine generally become contaminated with various harmful ingredients during operation of the engine. Such ingredients have been found to include constituents which have a corrosive effect upon various engine components, small metallic particles or chips, which have an abrasive effect, and a variety of other dirt and sludge producing elements which can be formed by combustion or accumulated in the engine in a number of ways and which tend to diminish the effectiveness of the lubricating oils and produce deleterious effects upon the engine.

It is an important object of the invention to provide a simple, integrated cartridge assembly which is effective in removing or rendering harmless the greatest amount of harmful ingredients found in lubricating oils as these oils are circulated through an internal combustion engine.

Another object of the invention is to provide an easily fabricated, readily disposable oil filter cartridge in which all of the operative elements cooperate to form an integrated assembly with each element properly presented for operation upon the circulating lubricating oils.

The invention may briefly be described as a disposable oil filter cartridge assembly for use in an internal combustion engine, the cartridge having an outer casing through which oil may pass, a non-ferrous metallic substance reactive with corrosive ingredients in the oil, a magnetic material, and an oil permeable filter element fixed within the casing and mechanically cooperating with the metallic substance and the magnetic material in such a way as to secure and maintain the substance and the material in assembled position with the filter element within the casing so that each will contact the oil.

The novel features of the invention, as well as additional objects and advantages thereof, will be more fully understood from the following detailed description of embodiments of the invention illustrated in the accompanying drawings in which.

Figure 1:
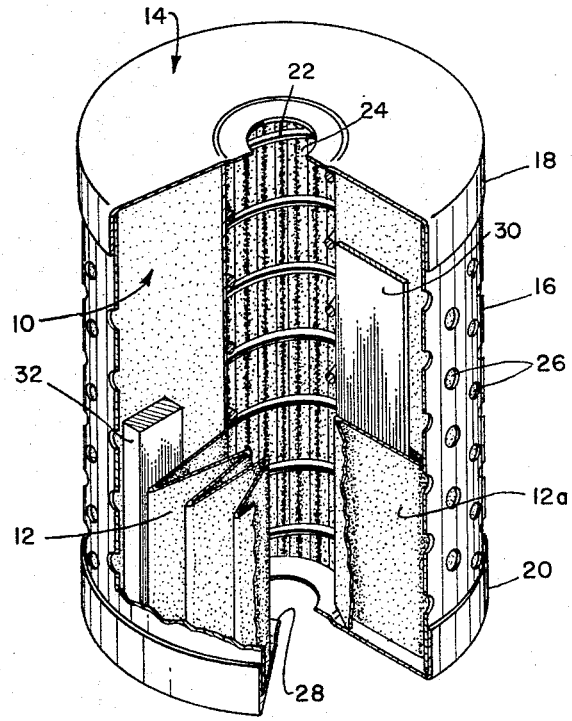
FIGURE 1 is a perspective view, partially cut away, illustrating an oil filter cartridge assembly constructed in accordance with the invention.

Referring now to the drawings, and more particularly to FIGURE 1, an oil filter cartridge assembly is shown with portions cut away to expose certain novel features of the invention. A mechanical filter element 10 is illustrated in the form of an annular, plicate member preferably constructed of an oil permeable paper folded into a number of plications 12. For purposes of illustration, the number of plications has been reduced and the plications themselves have been spread open slightly, an actual filter element having many more plications compressed closer together in the same general configuration. The filter element 10 is contained within an outer casing 14 which is comprised of an outer sleeve 16 surrounding the outside diameter of annular filter element 10, and end caps 18 and 20 which fit over the top and bottom ends, respectively, of the sleeve 16. A retainer 22, here shown in the form of a helical spring, is placed within the annular filter element 10 to maintain the cylindrical passage 24 within the filter element as shown.

In the use of the cartridge assembly in an internal combustion engine, the lubricating oil which is circulated through the engine is introduced to the filter cartridge at the outer sleeve 16. Perforations 26 are provided in the sleeve 16 to allow the oil to pass through the sleeve and to permeate the filter element 10 which will mechanically filter out those impurities which cannot pass through the filter element as the oil travels toward the central passage 24, whence it leaves the cartridge assembly through an outlet 28 provided in bottom end cap 20.

In order to render harmless those ingredients of the lubricating oil which are corrosive in nature, a metallic substance is placed within the filter cartridge in a position where the circulating oil may come into intimate contact with the metallic substance. The metallic substance is chosen from a group of those non-ferrous metals, or alloys of such metals, which will react with the corrosive ingredients in the oil to form products which are not harmful and which will have no deleterious effects upon the oil or components of the internal combustion engine. Among such metallic substances are aluminum, magnesium and zinc or alloys of these metals.

I have found that satisfactory results may be attained by inserting a strip or bar of such a metallic substance, preferably magnesium, within at least one, and preferably more than one, plication of the filter element. When more than one such bar is employed, the bars are preferably angularly spaced equally about the annular filter element. Thus, in the embodiments illustrated a strip or bar 30 of magnesium is shown placed in diametrically opposed plications 12a (see FIGURE 2), each bar being held securely in place by the compressive force of the faces of the plications upon the bar. Such a construction allows ease of assembly, since a bar 30 need merely be inserted within a plication prior to assembling the sleeve 16 and end caps 18 and 20, and conveniently maintains a relatively large surface area of a reactive, non-ferrous metal in a position within casing 14 where the metal can readily contact the oil.

Figure 2:
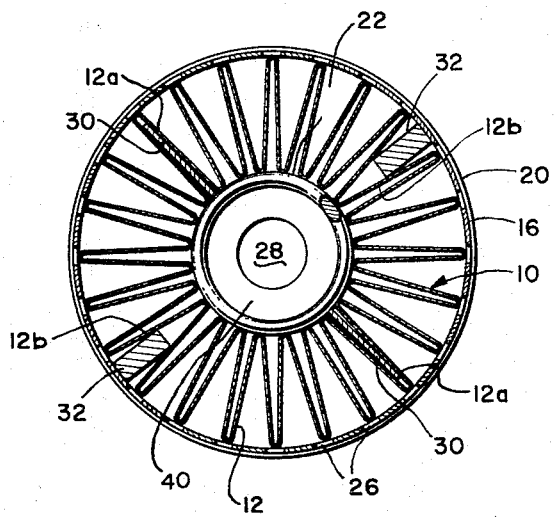
FIGURE 2 is a cross-sectional view of another embodiment of the invention.

In order to collect ferrous particles or chips which are carried by the oil and which might otherwise evade the filter cartridge, I have found it effective to insert a strip or bar of magnetic material within at least one, and preferably more than one, plication of the filter element 10. When more than one such bar is employed, the bars are preferably angularly spaced equally about the annular filter element. As shown in FIGURES 1 and 2, bars 32, formed of a permanent magnetic material, are each held in place adjacent the inside of sleeve 16 in diametrically opposed plications 12b (see FIGURE 2). Such a construction allows ease of assembly as outlined above and places the magnetic material in a position within the casing 14 where it will contact the circulating lubricating oil and accumulate those particles or chips capable of being magnetically attracted which may not necessarily be collected by the filter element 10 alone. In this respect it is noted that the magnetic bars 32, held securely in place by the compressive force of the faces of plications 12b upon the bars, are placed against the sleeve 16 so that particles which ordinarily would not even enter the filter cartridge assembly may now be collected about the magnetic bars 32 and be disposed of along with the filter cartridge assembly.

Figure 3:
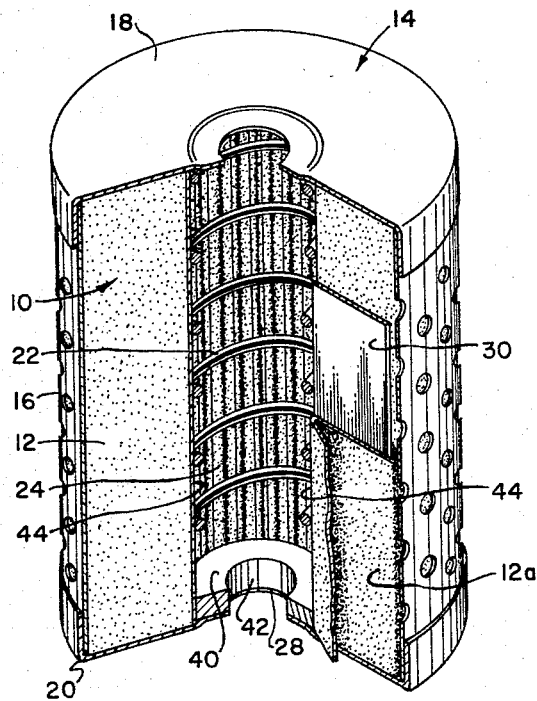
FIGURE 3 is a perspective view similar to that of FIGURE 1, but showing another embodiment of the invention.

Referring now to the embodiment of FIGURE 3, the general construction of the filter cartridge assembly is similar to that shown in FIGURE 1 and like parts are identified with the same reference characters; however, magnetic bars 32 have been deleted and are replaced by an annular permanent magnet 40 fixed in place within the cylindrical passage 24 over the outlet opening 28. In such a configuration, the circulating lubricating oil must pass through the bore 42 of the magnet 40 as the oil leaves the filter cartridge assembly. The magnet 40 will collect particles or chips of magnetically attracted material which may have evaded capture by the filter element 10. Assembly of the magnet 40 and the filter element 10 becomes a simple matter since the magnet need merely be forced into the cylindrical passage 24 to be held in place by the compressive force of the plications at their apexes 44.

In installations where an excessive amount of particles or chips are contemplated, which chips may be magnetically attracted, the magnetic material may be in the form of both bars and an annulus as shown in FIGURE 2, the annular magnet 40 serving to trap those particles which may evade both the mechanical filter element 10 and the bar magnets 32.

It will be apparent that the simplified construction of the oil filter cartridge assembly of the invention allows the component parts of the cartridge to be economically fabricated and assembled to produce a readily disposable unit. The particular arrangement of component parts assures that the configuration of the cartridge matches that of currently available commercial oil filter cartridges and interchangeability is maintained.

When the filter cartridge assembly has completed its useful life (i.e., when the mechanical filter element has collected enough foreign matter to reduce its efficiency below a desired level, the metallic substance has become exhausted, and the magnetic material has accumulated particles or chips) the entire assembly may be discarded and a new assembly substituted therefor, thus accomplishing replacement of all of the operative elements of the filter cartridge assembly with a minimum amount of effort and expense.

It is to be understood that the above detailed description of preferred embodiments of the invention is provided by way of example only and is not intended to restrict the invention. Various details of design and construction may be modified without departing from the true spirit and scope of the invention as defined in the appended claims.

I claim:

1. A disposable oil filter cartridge assembly for use in an internal combustion engine, said cartridge comprising:
   an outer perforated cylindrical casing through which oil may pass;
   an annular, oil permeable filter element having a central passage within said casing;
   at least one bar of a non-ferrous metal reactive with corrosive ingredients in the oil, said bar being fixed to and longitudinally coextensive with the filter element and maintained in fixed assembled position with the filter element within said casing by said filter element to contact said oil; and
   at least one magnet fixed to the filter element and maintained in fixed assembled position with the filter element within said casing by said filter element to contact said oil.

2. A disposable oil filter cartridge assembly for use in an internal combustion engine, said cartridge comprising:
   an outer perforated cylindrical casing through which oil may pass;
   an oil permeable filter element within said casing, said filter element having an annular, plicate configuration including an inner cylidrical passage and a plurality of plications having opposed faces extending generally radially from said outer casing to apexes at the inner cylindrical passage;
   bars of a non-ferrous metal reactive with corrosive ingredients in the oil, said bars being mechanically secured and maintained in assembled position within the said casing by mechanical cooperation with said filter element to contact said oil, the bars being held securely within at least some plications of said filter element by the compressive force of the faces of each said plication upon a bar secured within the plication; and
   a magnetic material mechanically secured and maintained in assembled position with the filter element within said casing by mechanical cooperation with said filter element to contact said oil, said magnetic material being in the form of bars held securely within at least some plications of said filter element by the compressive force of the faces of each said plication upon a bar secured within the plication.

3. A disposable oil filter cartridge assembly for use in an internal combustion engine, said cartridge comprising:
   an outer perforated cylindrical casing through which oil may pass;
   an oil permeable filter element within said casing, said filter element having an annular, plicate configuration including an inner cylidrical passage and a plurality of plications having opposed faces extending radially from said outer casing to apexes at the inner cylindrical passage;
   bars of a non-ferrous metal reactive with corrosive ingredients in the oil, said bars being mechanically secured and maintained in assembled position within the said casing by mechanical cooperation with said filter element to contact said oil, the bars being held securely within at least some plications of said filter element by the compressive force of the faces of each said plication upon a bar secured within the plication; and
   a magnetic material mechanically secured and maintained in assembled position with the filter element within said casing by mechanical cooperation with said filter element to contact said oil, said magnetic material being in the form of an annulus and being placed within said cylindrical passage of the filter element and secured within the cylindrical passage by the compressive force of the apexes of said plications upon the annulus of magnetic material such that oil will pass through said annulus as said oil leaves said filter cartridge.

4. A disposable oil filter cartridge assembly for use in an internal combustion engine, said cartridge comprising:
   an outer perforated cylindrical casing through which oil may pass;
   an oil permeable filter element within said casing, said filter element having an annular, plicate configuration including an inner cylindrical passage and a plurality of plications having opposed faces extending generally radially from said outer casing to apexes at the inner cylindrical passage;
   bars of a non-ferrous metal reactive with corrosive ingredients in the oil, said bars being mechanically secured and maintained in assembled position within the said casing by mechanical cooperation with said filter element to contact said oil, the bars being held securely within at least some plications of said filter element by the compressive force of the faces of each said plication upon a bar secured within the plication; and a magnetic material mechanically secured and maintained in assembled position with the filter element within said casing by mechanical cooperation with said filter element to contact said oil, said magnetic material being in the form of bars and an annulus, said bars being held securely within at least some plications of said filter element by the compressive force of the faces of each said plication upon a bar secured within the plication and said annulus being placed within said cylindrical passage of the filter element and secured within the cylindrical passage by the compressive force of the apexes of said plications upon the annulus of magnetic material such that said oil will pass through said annulus as said oil leaves the filter cartridge.

References Cited by the Examiner

UNITED STATES PATENTS

| | | | |
|---|---|---|---|
| 2,838,179 | 6/1958 | Thomas | 210—223 |
| 2,887,230 | 5/1959 | Sicard | 210—222 |
| 2,980,257 | 4/1961 | Paton | 210—223 |
| 3,127,255 | 3/1964 | Winslow | 210—168 X |

OTHER REFERENCES

Lee Filter Corp. Advertisement: Popular Science; vol. 174, No. 6, p. 205; June 1959.

REUBEN FRIEDMAN, *Primary Examiner.*

HARRY B. THORNTON, *Examiner.*

F. W. MEDLEY, *Assistant Examiner.*